US009393758B2

(12) United States Patent
Ponsolle et al.

(10) Patent No.: US 9,393,758 B2
(45) Date of Patent: Jul. 19, 2016

(54) DRY FIBROUS MATERIAL FOR SUBSEQUENT RESIN INFUSION

(71) Applicants: Cytec Industries Inc., Woodland Park, NJ (US); Cytec Engineered Materials Inc., Tempe, AZ (US)

(72) Inventors: Dominique Ponsolle, Winona, MN (US); Carmelo Luca Restuccia, Chester (GB); William Jacobs, Bethel, CT (US); Robert Blackburn, Hull (GB); Carmelo LoFaro, Scottsdale, AZ (US); Richard Price, Corona, CA (US); Marc Doyle, Chester (GB); Mitchell Smith, Bel Air, MD (US); Mark Roman, South Jordan, UT (US); Abdel Abusafieh, Abu Dhabi (AE)

(73) Assignee: Cytec Industries Inc., Woodland Park, NJ (US)

( * ) Notice: Subject to any disclaimer, the term of this patent is extended or adjusted under 35 U.S.C. 154(b) by 123 days.

(21) Appl. No.: 14/366,711

(22) PCT Filed: Dec. 19, 2012

(86) PCT No.: PCT/US2012/070480
§ 371 (c)(1),
(2) Date: Jun. 19, 2014

(87) PCT Pub. No.: WO2013/096377
PCT Pub. Date: Jun. 27, 2013

(65) Prior Publication Data
US 2014/0370237 A1  Dec. 18, 2014

Related U.S. Application Data (60) Provisional application No. 61/577,990, filed on Dec. 20, 2011.

(51) Int. Cl.
*B32B 5/02* (2006.01)
*B32B 5/12* (2006.01)
(Continued)

(52) U.S. Cl.
CPC .............. *B32B 5/022* (2013.01); *B29B 15/12* (2013.01); *B32B 3/266* (2013.01); *B32B 5/024* (2013.01);
(Continued)

(58) Field of Classification Search
None
See application file for complete search history.

(56) References Cited

U.S. PATENT DOCUMENTS 3,936,558 A * 2/1976 Bolen ............... D04H 3/12
428/212
4,407,885 A * 10/1983 Murphy ............ D06M 23/06
428/402

(Continued)

FOREIGN PATENT DOCUMENTS

EP  1408152 A1  4/2004
EP  1419875 A1  5/2004

(Continued)

OTHER PUBLICATIONS

"InChemRez Phenoxy Resins Discover the New Dimensions". Jan. 1, 2002. http://www.brenntagspecialties.com/en/downloads/Products/ACES/InChem/InChem_Product_Brochure.pdf.

*Primary Examiner* — Jeff Vonch
(74) *Attorney, Agent, or Firm* — Thi D. Dang (57) ABSTRACT

Disclosed herein is a dry, self-supporting fibrous material, the fibers of which have been treated with a binder composition. The fibrous material can be slit into tapes or tows that are suitable for use in an Automated Tape Laying (ATL) or Automated Fiber Placement (AFP) process. This fibrous material is suitable for forming preforms which are configured to receive a matrix resin by resin infusion in the manufacturing of structural composite parts.

15 Claims, 4 Drawing Sheets (51) Int. Cl.

| | |
|---|---|
| *B32B 5/18* | (2006.01) |
| *B32B 5/26* | (2006.01) |
| *B32B 5/28* | (2006.01) |
| *B29C 70/08* | (2006.01) |
| *B29C 70/38* | (2006.01) |
| *B29B 11/16* | (2006.01) |
| *B29B 11/02* | (2006.01) |
| *B29B 11/04* | (2006.01) |
| *B29B 11/08* | (2006.01) |
| *B29B 15/12* | (2006.01) |
| *B32B 3/26* | (2006.01) |
| *B32B 37/16* | (2006.01) |
| *B32B 38/04* | (2006.01) |
| *B32B 38/08* | (2006.01) |
| *B32B 38/00* | (2006.01) |
| *C08G 18/16* | (2006.01) |
| *C08G 18/48* | (2006.01) |
| *C08G 18/75* | (2006.01) |
| *C08G 18/83* | (2006.01) |
| *C08K 3/20* | (2006.01) |

(52) U.S. Cl.
CPC . *B32B 5/26* (2013.01); *B32B 37/16* (2013.01); *B32B 38/04* (2013.01); *B32B 38/08* (2013.01); *B32B 38/164* (2013.01); *C08G 18/168* (2013.01); *C08G 18/4833* (2013.01); *C08G 18/4879* (2013.01); *C08G 18/755* (2013.01); *C08G 18/833* (2013.01); *C08K 3/20* (2013.01); *B29C 2793/0036* (2013.01); *B29C 2793/0081* (2013.01); *B32B 2038/045* (2013.01); *B32B 2255/02* (2013.01); *B32B 2255/26* (2013.01); *B32B 2262/106* (2013.01); *B32B 2274/00* (2013.01); *B32B 2305/20* (2013.01); *B32B 2363/00* (2013.01); *B32B 2371/00* (2013.01); *B32B 2375/00* (2013.01); *Y10T 428/2481* (2015.01); *Y10T 428/24314* (2015.01)

(56) References Cited

U.S. PATENT DOCUMENTS

| | | | | |
|---|---|---|---|---|
| 5,480,603 | A * | 1/1996 | Lopez | B29B 11/16 264/131 |
| 6,008,150 | A | 12/1999 | Thyssen et al. | |
| 6,020,063 | A * | 2/2000 | Riffle | C08J 5/06 428/105 |
| 6,995,099 | B1 * | 2/2006 | Nishimura | B29C 70/083 428/113 |
| 7,358,202 | B2 * | 4/2008 | Hartman | B23B 5/12 428/107 |
| 7,412,756 | B2 * | 8/2008 | Droux | B32B 5/26 28/107 |
| 8,048,815 | B2 * | 11/2011 | Kubota | C08J 5/24 428/364 |
| 8,409,486 | B2 * | 4/2013 | Sutter | D01D 5/08 264/257 |
| 2004/0170554 | A1 * | 9/2004 | Wadahara | B29B 11/16 423/447.2 |
| 2004/0241415 | A1 * | 12/2004 | Wadahara | B29C 70/226 428/298.1 |
| 2005/0070183 | A1 * | 3/2005 | Dunn | B29C 70/226 442/59 |
| 2005/0124243 | A1 * | 6/2005 | Patel | D06M 14/00 442/93 |
| 2005/0197023 | A1 * | 9/2005 | Woolstencroft | B29C 70/08 442/181 |
| 2006/0252334 | A1 * | 11/2006 | LoFaro | B23B 5/022 442/400 |
| 2008/0260954 | A1 * | 10/2008 | Paton | B29B 11/16 427/385.5 |
| 2011/0151179 | A1 * | 6/2011 | Batge | B29B 11/16 428/102 |
| 2014/0322511 | A1 | 10/2014 | Beraud et al. | |

FOREIGN PATENT DOCUMENTS

| | | | |
|---|---|---|---|
| JP | 2005336407 A | * | 12/2005 |
| JP | 2006027091 A | * | 2/2006 |

* cited by examiner

Veil Side

Fiber Web Side

DRY FIBROUS MATERIAL FOR SUBSEQUENT RESIN INFUSION

This application is a national stage entry of the International Application No. PCT/US2012/070480 filed on Dec. 19, 2012, which claims the benefit of priority from U.S. Provisional Application No. 61/577,990 filed on Dec. 20, 2011, both of which are incorporated herein by reference.

BACKGROUND

The present disclosure is related to the field of preforming and resin infusion manufacturing of structural composite components.

In recent years, the aerospace and automotive industries showed increasing levels of interest in the application of resin infusion processes to manufacture structural components.

Dry, flexible and pre-formable fibrous products can in fact have significant advantages over standard pre-pregged materials due their longer shelf life and applicability to more complex geometries and around narrow radii.

The aspects of interdependence and criticality of the materials selection and processing stages are of special significance in automated lay-down/infusion processes wherein the stages of fiber placement, preforming and resin injection are distinct in phase, but coupled in materials selection and processing related aspects.

Sizings and binders can in fact simultaneously affect processing and thermo-mechanical performance of composite structures.

Composites cure kinetics and thermo-mechanical properties can be in fact influenced by the formation of an interface region between the fibrous component and the hosting matrix. In addition fiber/sizing/resin interactions occurring during the infusion stage can affect wet-out and local flow behavior through the development of stoichiometric and compositional imbalanced regions.

Most fibers and fibrous products used in composites are coated with sizings, binders, and/or finishes that serve multiple purposes, including facilitating handling, protection of the fibers from compaction and process induced damage, aiding in compatibility and wetting of the fibers by the resin, and overall enhancement of the composites performance.

Several dry unidirectional tape products utilize a carbon web of unidirectional carbon fibers that has been thermally or adhesively bonded onto a carrier fabric or scrim to support the unidirectional carbon fibers. Several commercial versions are available from V2 Composites, Sigmatex and other textile producers. The limitations of these current products lies in the inability to slit and apply these products via an automated lay down process without deforming and fraying the edges.

In other conventional materials such as the NCF textile (non-crimp fabric), the unidirectional (UD) fiber tows are held together by stitching threads crossing over several carbon tows. In some occasions, very fine fibers are laid across the cross-web direction to provide more lateral stability to the UD fiber tows. In this case, the tows are not spread out and inter-tow gaps as wide as 2 mm exist. Saertex and Sigmatex supply this type of products.

Another conventional method of forming a dry unidirectional tape is the technique comprising spreading a web of fibers and holding the spread fibers with a binderized fine threads usually made of epoxy coated glass threads or polyester or polyamide threads with low heat activation point, running across the width of the tape and holding the spread fibers together. The holding threads are not woven with the web fibers but deposited on the top and/or bottom faces of the web. In this type of product, web fibers are usually well spread out leaving very little tow definition and inter-tow gaps, similarly to standard spread tape produced on prepreg tape machines.

It is believed that none of the state of the art binder compositions or material solutions satisfies the physical, thermo-mechanical and process requirements for the production of dry, fibrous materials that are suitable for used in Automated Tape Laying (ATL) and Automated Fiber Placement (AFP) to form preforms for subsequent resin infusion in composite part manufacturing.

SUMMARY

Disclosed herein is a dry, self-supporting fibrous material of structural fibers to be used for subsequent resin infusion. The fibrous material contains structural fibers that are bound together by a binder component present in an amount of 15% by weight or less of the material. The binder component does not form a continuous film at the surface of the fibrous material. The fibrous material is characterized in that it is fluid-permeable, more specifically, it is permeable to liquid resins, it frays less upon slitting, and has a lower dimensional variation than the same fibrous material without binder.

Also disclosed herein is a binder composition for applying onto the structural fibers. The binder composition is a waterborne dispersion containing (i) one or more polymers selected from: polyurethane; polyhydroxyether; a copolymer thereof; a reaction product thereof; and a combination thereof; (ii) a cross-linker; and optionally, (iii) a catalyst of sufficient acid strength to catalyze the crosslinking reaction.

DETAILED DESCRIPTION OF THE PREFERRED EMBODIMENT

The technological challenges connected to the manufacture of narrow-width, fibrous products suitable for automated lay-up processes, more specifically, ATL and AFP, determined the need for binder compositions capable of providing cohesion and integrity to the fibers during the slitting, handling and lay-down processes and preventing the creation of fuzzy edges which can dramatically affect the process speed and throughput.

One aspect of the present disclosure lies in a dry, self-supporting fibrous material of structural fibers that has been treated with a unique liquid binder composition, wherein the resulting binder-treated fibrous material is permeable to liquid resin, and the binder composition does not form a continuous film at the surface of the fibrous material. The binder composition is present in an amount of 15% or less by weight, e.g. 0.1 and 15% by weight, based on the total weight of the fibrous material, and the structural fibers is the major component of the fibrous material (e.g. greater than 50% by weight based on the total weight of the fibrous material). The starting fibrous material to be treated with the binder composition may be in the form of fibers (including unidirectional or multi-directional fibers), yarns, tows, woven or nonwoven fabrics.

In one embodiment, a dry, unidirectional fiber web composed of unidirectional structural fibers (e.g. carbon fibers) in areal weights in line with state of the art prepreg tape is bonded to a nonwoven veil of thermoplastic fibers, using a continuous process on a hot-melt type production line. The bonded structure of unidirectional tape/veil is then coated with the liquid binder composition disclosed herein. In one embodiment, the nonwoven veil contains randomly-arranged thermoplastic fibers that are soluble in epoxy resins. The detailed description of the resin-soluble veil may be found, for example, in the published patent application US 2006/0252334. The unidirectional tape may be made by a conventional prepreg method of spreading a web of structural fibers and using a tape machine to do so. A resin-soluble thermoplastic veil is then laminated to the spread structural fibers to keep the tape form.

In another embodiment, a nonwoven veil composed of structural fibers (e.g. carbon fibers) is laminated to a fiber web (i.e., a web of spread fibers), and a thermoplastic modified epoxy-based binder is coated or deposited onto the veil, then the veil is laminated to the fiber web using a prepreg tape machine to form the dry tape. Subsequently, the dry tape is coated by dip-coating with the water-borne binder composition disclosed herein. The water-borne binder composition disclosed herein does not completely coat the modified epoxy-based binder. The resulting binder-coated tape is slit into narrow tapes or tows of desired widths that are suitable for ATL/AFP, for example, 24 in or less, or 1.5 in or less. In one embodiment, the modified epoxy-based binder contains one or more multifunctional epoxy resins and a thermoplastic polymer, and may be in the form of particles or film. The incorporation of the modified epoxy based binder on the surfaces of the fiber web and veil can further facilitate the bonding of the slit tape/tow to the tool surface or to a previously laid down tape/tow.

The unique liquid binder composition disclosed herein is used to coat or infiltrate the fibrous material. The binder-treated fibrous material is suitable for the fabrication of preforms, which are subsequently infused with liquid resin. As such, the binder-treated fibrous material is a fluid-permeable product that is very low in resin content (i.e., the binder resin content not the matrix resin to be injected later) prior to resin infusion. The resin-infused preforms are then cured to form composite parts.

The liquid binder composition as discussed above is based on a water-borne dispersion containing: (i) one or more polymers selected from polyhydroxyethers, polyurethanes, copolymers thereof, reaction products thereof, or combinations thereof; (ii) a cross-linker; and optionally, (iii) a catalyst.

In one embodiment, the binder composition is applied as a polymer emulsion to coat or infiltrate the fiber yarns/tows or fibrous textiles at room temperature. Water is then removed/evaporated according to a controlled time/temperature profile to achieve the desired physical properties balance. The resulting coated yarns/tows or fibrous textiles are suitable for use with automatic tape and fiber laydown technologies such as automated tape laying (ATL) and automated fiber placement (AFP) to manufacture preforms, which are configured for receiving liquid matrix resin in a subsequent resin infusion process. The binder composition may be applied to the yarns/tows or textile in a concentration between the 0.1 and 15% by weight relative to the total weight of the final product.

When the binder composition is applied to fibrous materials in large sizes, the resulting binder-treated materials can be slit into elongated tapes or tows with narrow width so that they are suitable for use in the production of dry fiber preforms via ATL and AFP processes. The binder composition of the present invention consistently improves the handling and slitting of the coated or infiltrated yarns/tows or fibrous textiles into narrower products and their shaping into the preform before they are infused with resin. The binder composition also provides improvements in the bond strength between the coated fibrous component and the composite matrix after the infusion and cure without unduly sacrificing important laminates physical properties such as the glass transition temperature (Tg) in dry and hot/wet (H/W) conditions and the mechanical performance.

The performance in producing preforms and composite parts is increased by using binders that help stabilize the unidirectional structural fiber textile for slitting into narrow tapes, help the tape laydown process and preform manufacture, and do not interfere with the resin infusion process nor the mechanical performance of the final composite part. Further, in some embodiments, a very light, nonwoven veil is bonded to the unidirectional structural fiber textile prior to binder coating and slitting. The veil enhances the in-plane resin diffusion during the resin injection cycle. In some aspects, perforations of the uni-directional structural fiber textile may be helpful to improve the resin diffusion through the thickness of the textile material during the resin infusion process.

Resulting benefits of using a dry unidirectional tape in an ATL/AFP process include the efficient creation of a required preform through reduced touch labor, high lay-down rates and the ability to create the preform in an in-situ fashion, eliminating the need for any dedicated preforming cycle of heat and pressure. Compared to more traditional textile routes dry ATL/AFP is expected to return a much reduced level of material scrap due to the elimination of any need to nest large plies from a textile roll.

The resulting benefits for composites made of a dry unidirectional tape over traditional textiles include improved mechanical properties, very good fiber volume fraction and excellent cured ply thickness (CPT) that is not deteriorated by the addition of the very light veil. The composite fiber volume fraction is calculated using the following equation:

$$V_f = \frac{W_f \rho_m}{W_m \rho_f + W_f \rho_m}$$

where:
$V_f$=Fibers volume fraction
$W_f$=Weight of fibers
$W_m$=Weight of matrix resin
$\rho_f$=Density of fibers
$\rho_m$=Density of matrix resin The CPT is the theoretical thickness of an individual ply, which is a function of the fiber areal weight, resin content, fiber density and resin density.

As an additional benefit, the veil, which is located at the interlaminar region between plies of structural fibers and highly loaded with resin, may act as a carrier for materials such as toughening particles or toughening fibers for further toughening of the resulting composite.

High quality slit tapes and slit tows may be obtained by sufficiently high cohesion between the filaments. Good cohesion may prevent the individual filaments from separating from the slit tape/tow during the slitting process and other subsequent handlings such as when the tape/tow is processed through the automated machines.

In some aspects, the liquid binder composition disclosed herein penetrates the structure of the unidirectional tape, prior to slitting, and keeps the filaments together. This penetration is also helpful to control the width of the resulting slit tape.

In some embodiments, the type and amount of binder and/or sizing agents does not impede the automated laydown process or the composite manufacture in particular the resin injection, and does not alter the mechanical performance of the composite or its $T_g$.

In some embodiments, good lay down performance and high throughput is achieved due to attributes of the slit tape/tow, such as a good cohesion and stability, a good robustness to the process in particular agitation and friction, and the ability to tack to the tool or first ply, and subsequent plies.

Tacking a ply of fibrous material to the tool or a previous ply may be achieved by using a binder that is heat activated during the laydown process. It is preferred that the binder does not impede the laydown process, the composite manufacture, the composite mechanical performance, or its $T_g$.

Resin diffusion through a preform during the resin injection cycle may be a function of the permeability of the preform and the direction of travel of the resin compared to the distribution of the permeability. For example, in some instances infusing parallel to the plies of the unidirectional structural carbon fiber textile may be achieved easily while diffusing the resin through the thickness may be more challenging, due to gaps or very small gaps between the fibers of, for example unidirectional tapes, hence limiting the resin flow through the thickness. Providing perforations of the webs, such as about 10 per cm$^2$, allows resin to flow sufficiently in the Z direction. The fabrication mode of the unilateral tape layer may affect the desirability of having perforations to facilitate resin flow. For example, a through-thickness air permeability of greater than 25 cc/min may be required for the preform, and greater than 50 cc/min may be preferred, depending on the process window of the resin system used and thickness of preform to be infused.

Binder Compositions

Binders have the various purposes such as for cohesion of the structural fibers, for binding structural fibers, and to provide tack so the material remains in a stationary position during the lay down process. A binder may be selected to help maintain cohesion of the fibers that form the unidirectional or textile material layer during the slitting process. It is helpful if the binder does not impede the lay down process or the composite manufacture and in particular, the resin injection process. Binders for binding fibers may be reactive or nonreactive with the resin matrix when forming a composite material, and examples include thermoplastic binders. The binder generally should not significantly affect the mechanical performance of the resulting composite nor lower its $T_g$. In addition, it is preferred that the binder is easy to process and have a low-cost.

A binder composition for treating structural fibers/textile material for the purposes disclosed herein is a water-borne binder composition containing one or more polymers selected from the group consisting of polyurethanes, aromatic polyhydroxyethers, copolymers, mixtures, reaction products or blends thereof, in combination with least one aminoplast cross-linker, and optionally, a catalyst of sufficient acid strength to catalyze the crosslinking reaction. The acid catalysts may include, but are not limited to, proton donating acids such as carboxylic, phosphoric, alkyl acid phosphates, sulfonic, di-sulfonic acids and/or Lewis acids such as aluminum chloride, bromide or halide, ferric halide, boron tri-halides, and many others in both categories as is well known to one skilled in the art. In a preferred embodiment, the cross-linker is a melamine-based cross-linker, for example, tri- to hexa-methoxyalkyl melamine class of aminoplast cross-linkers.

The polyurethane can be synthetized reacting a polyisocyanate with one or more polyols having a number average molar mass ($M_n$) of at least 400 g/mol, selected from a group consisting of aliphatic or aromatic polyether polyols and polyester polyols and optionally:

a compound capable of forming anions and with at least two groups that are reactive towards isocyanate groups;
a low molar mass polyol with $M_n$ of from 60 to 400 g/mol;
a combination thereof.

Suitable polyisocyanates (which means compounds having a plurality of isocyanate groups) for preparing the polyurethane include any organic polyisocyanate, preferably monomeric diisocyanates. Especially preferred are polyisocyanates, especially diisocyanates, having aliphatically- and/or cycloaliphatically-bound isocyanate groups, although polyisocyanates having aromatically-bound isocyanate groups are not excluded and may also be used, Examples of suitable polyisocyanates which may be used include ethylene diisocyanate, 1,4-tetramethylene diisocyanate, 1,6-hexamethylene diisocyanate, 2,4,4-trimethyl-1,6-hexamethylene diisocyanate, 1,12-dodecanediisocyanate, cyclobutane-1,3-diisocyanate, cyclohexane-1,3- and/or -1,4-diisocyanate, 1-isocyanato-2-isocyanatomethyl cyclopentane, 1-iso cyanato-3,3,5-trimethyl-5-isocyanatomethyl cyclohexane(isophorone diisocyanate or HMI), 2,4- and/or 2,6-hexahydrotoluylene diisocyanate, 2,4'- and/or 4,4'-dicyclohexylmethane diisocyanate, a,a,a',a-tetramethyl-1,3- and/or -1,4-xylylene diisocyanate, 1,3- and 1,4-xylylene dilsocyanate, 1-isocyanato-1-methyl-4(3)-isocyanatomethylcyclohexane, 1,3- and 1,4-phenylene diisocyanate, 2,4- and/or 2,6-toluylene diisocyanate, diphenyl methane-2,4'- and/or -4,4'-diisocyanate, naphthalene-1,5-diisocyanate, triphenylmethane-4,4',4''-triisocyanate, polyphenyl polymethylene polyisocyanates of the type obtained by condensing aniline with formaldehyde followed by phosgenation, and mixtures of the above-mentioned polyisocyanates.

Suitable polyols preferably have a number average molar mass ($M_n$) of from 400 g/mol to 5000 g/mol. Examples of suitable polyols include aliphatic polyether polyols such as polyoxyethylene glycol, polyoxypropylene glycol, or mixed polymers of such units, polyester polyols obtainable by polycondensation of diols or polyols with dicarboxylic or polycarboxylic acids, such polyester polyols including polyethylene adipate, mixed polyesters derived from ethylene glycol, hexane diol, trimethylol propane, adipic and terephthalic acid, etc. Other building blocks that may constitute, or be included in, such polyester polyols are hydroxycarboxylic acids such as hydroxybutyric or hydroxy caproic acid or their lactones.

Suitable aromatic polyether polyols are epoxy resins or phenoxy resins, or mixtures thereof.

The terms "poly(hydroxyether)" and "phenoxy" herein refer to substantially linear polymers having the general formula:

wherein D is the radical residuum of a dihydric phenol, E is a hydroxyl-containing radical residuum of an epoxide and n represents the degree of polymerization and is at least 30 and is preferably 80 or more. The term "thermoplastic poly (hydroxyether)" is intended to include mixtures of at least two thermoplastic poly (hydroxyethers).

The dihydric phenol contributing the phenol radical residuum, D, may be either a dihydric mononuclear or a dihydric polynuclear phenol such as those having the general formula:

wherein Ar is an aromatic divalent hydrocarbon such as naphthylene and, preferably, phenylene, X and Y Which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, a and b are integers having a value from 0 to a maximum value corresponding to the number of hydrogen atoms on the aromatic radical (Ar) which can be replaced by substituents and R is a bond between adjacent carbon atoms as in dihydroxydiphenyl or is a divalent radical including, for example, and divalent hydrocarbon radicals such as alkylene, alkylidene, cycloaliphatic, e.g., cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or R1 can be polyalkoxy, or polysiloxy, or two or more alkylidene radicals separated by an aromatic ring, a tertiary amino group, an ether linkage, a carbonyl group or a sulfur-containing group such as sulfoxide, and the like.

Examples of specific dihydric polynuclear phenols include, among others:

The bis(hydroxyphenyl) alkanes such as 2,2-bis-(4-hydroxyphenol)propane, 2,4'-dihydroxydiphenylmethane, bis(2-hydroxyphenyl)methane, bis(4-hydroxyphenyl)methane, bis(4-hydroxy-2,6-dimethyl-3-methoxyphenyl)methane, 1,1-bis(4-hydroxyphenyl ethane, 1,2-bis(4-hydroxyphenyl)-ethane, 1,1-bis(4-hydroxy-2-chlorophenyl)ethane, 1,1-bis-(3-methyl-4-hydroxyphenyl)ethane, 1,3-bis(3-methyl-4-hydroxyphenyl)propane, 2,2-bis(3-phenyl-4-hydroxyphenyl)-propane, 2,2-bis(3-isopropyl-4-hydroxyphenyl)propane, 2,2-bis(2-isopropyl-4-hydroxyphenyl)propane, 2,2-bis-(4-hydroxylnaphthyl)propane, 2,2-bis(4-hydroxyphenyl)-pentane, 3,3-bis(4-hydroxyphenyl)pentane, 2,2-bis(4-hydroxyphenyl)heptane, bis(4-hydroxyphenyl)phenylmethane, bis(4-hydroxyphenyl)cyclohexylmethane, 1,2-bis(4-hydroxyphenyl-1,2-bis(phenyl)propane, 2,2,-bis(4-hydroxyphenyl)-1-phenyl-propane and the like;

Di(hydroxyphenyl)sulfones such as bis(4-hydroxy-phenyl)sulfone, 2,4'-dihydroxydiphenyl sulfone, 5'-chloro-2,4'-dihydroxydiphenyl sulfone, 5'-chloro-4,4'-dihydroxydiphenyl sulfone and the like;

Di(hydroxyphenyl)ethers such as bis(4-hydroxy-phenyl) ether, the 4,3'-, 4,2'-, 2,2'-, 2,3'-, di-hydroxydiphenyl ethers, 4,4'-dihydroxy-2,6-dimethyldiphenyl ether, bis(4hydroxy-3-isobutylphenyl)ether, bis(4-hydroxy-3-isopropylphenyl) ether, bis(4-hydroxy-3-chlorophenyl)-ether, bis(4-hydroxy-3flurophenyl)ether, bis(4-hydroxy-3-bromophenyl)ether, bis (4-hydroxynaphthyl)ether, bis(4-hydroxy-3-chloronaphthylether, bis(2-hydroxydiphenyl)-ether, 4,4'-dihydroxy-2,6-dimethoxydiphenyl ether, 4,4-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bis-phenol reaction products of dipentene or its isomers and phenols such as 1,2-bis(p-hydroxyphenyl)-1-methyl-4-isopropylcyclohexane as well as bisphenols such as 1,3,3'trimethyl-1-(4-hydroxyphenyl)-6-hydroxyindane, and 2,4-bis(4-hydroxyphenyl)-4-methylpentane, and the like.

wherein X and Y are as previously defined, a and b have values from 0 to 4, inclusive, and R is a divalent, saturated aliphatic hydrocarbon radical, particularly alkylene and alkylidene radicals, having from 1 to 3 carbon atoms, and cycloalkylene radicals having up to and including 10 carbon atoms.

Mixtures of dihydric phenols may also be used, and whenever the term "dihydric phenol" or "dihydric polynuclear phenol" is used herein, mixtures of these compounds are intended to be included.

The epoxide contributing the hydroxyl containing radical residuum, E, can be monoepoxide or diepoxide. A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e., >C—C< and acetylenic unsaturation, i.e., —C≡C—, are preferred. Particularly preferred are halogen substituted saturated monoepoxides, i.e., the epichlohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen carbonyl oxygen and the like.

Specific examples of monoepoxides include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate), bis(3,4-epoxycyclohexyl-methyl)adipate, bis(3,4-epoxycyclohexyl-methyl)phthalate, 6-methyl-3,4-epoxycyclohexylmethyl-6-methyl-3,4-epoxycyclohexane carboxylate, 2-chloro-3,4-epoxcylohexylmethyl-2-chloro-3,4-epoxycyclohexane-carboxylate, diglycidyl ether, bis(2,3-epoxycyclopentyl)-ether, 1,5-pentanediol bis(4-methyl-3,4-epoxycyclohexyl-methyl)ether, bis(2,3-epoxy-2-ethylhexyl)adipate, diglycidyl maleate, diglycidyl phthalate, 3-oxa-tetracyclo[4.4.0.17,10.02,4]-undec-8-yl

2,3-epoxy-propyl ether, bis(2,3-epoxycyclopentyl)sulfone, bis(3,4-epoxyhexoxypropyl)sulfone, 2,2'-sulfonyldiethyl, bis(2,3-epoxycyclopentanecarboxylate),3-oxatetracyclo-[4.4.0.17,10.0 2,4]-undec-8-yl 2,3-epoxybutyrate, 4-pentenal-di-(6-methyl-3,4-epoxycyclohexylmethyl) acetal, ethylene glycol bis(9,10-epoxystearate), diglycidyl carbonate, bis (2,3-epoxybutylphenyl)-2-ethylhexyl phosphate, diepoxydioxane, butadiene dioxide, and 2,3-dimethyl butadiene dioxide.

Examples of compounds capable of forming anions include polyols, particularly diols, and polyamines, particularly diamines, or hydroxyamines, that carry from 1 to 3 carboxyl or sulfonic acid groups per molecule.

Examples of carboxylate containing compounds of this composition include the reaction of isocyanated terminated polyol pre-polymers (obtained by the reaction of excess di-isocyantate with hydroxyl containing per-polymers) with hydroxyl containing carboxylic acids. Examples of cationic terminated compounds of this invention include the quarternary ammonium or phosphonium prepolymers. Such cationic compositions can be prepared by the reaction of tert-amine containing alcohols with above said isocyanated terminated pre-polymers followed by reaction with a quarterizing agent such as dimethyl sulfate or an alkyl halide as is known by one skilled in the art.

Examples of low molar mass polyols with a molar mass of preferably from 60 to 400 include ethylene glycol, diethylene glycol, 1,4-butane diol, cyclo-hexane diol and any other diol known to those skilled in the art.

Examples of preferred water borne phenoxy resin are condensation polymers derived from bisphenol-A (2,2-bis(p-hydroxyphenyl)propane and epichlorohydrin having the structural formula:

Examples of polyhydroxyether water dispersions are Phenoxy PKHB, PKHH and PKHC commercialized with the trade designation of PKHW 34, 35 and 38 by InChem.

Suitable crosslinkers include aminoplasts, or amino resin cross-linkers which are the reaction products of either urea or melamine with formaldehyde and an alcohol. Besides urea and melamine, other compounds with similar functionality such as benzoguanamines, glycolurils, cyclic ureas, hydantoins, primary and secondary amides, carbamates etc., may also be used where certain property advantages are required.

The cross-linking reaction ("cure") is principally one of trans-etherification between hydroxyl groups on the primary polymeric portion and alkoxymethyl or alkoxybutyl groups on the amino resin. In addition to the trans-etherification reaction, the amino resin almost always undergoes self-condensation reactions to some extent, more or less dependent upon the amino resin type.

Another attribute of aminoplast cross-linkers is that their hydrophilic or hydrophobic characteristics can be tailored so that it is possible by one skilled in the art to select whether the amino resin crosslinker resides predominately in the organic phase or the aqueous phase of the aqueous dispersions. There may be certain advantages for the amino resin crosslinker to reside in one phase or the other, particularly if it is desired to apply the composition by different methods such as dipping, roller coating or spraying where one or both phases may or may not be desired to remain on the substrate before curing.

The major by-products of the cure reaction include methanol and/or butanol and water. Cure temperatures are typically in the range of 180 to 465° F. (82 to 232° C.) for times that vary from 15 to 30 min at the lower end of the temperature range to perhaps only a few seconds at the upper end. There are highly catalysed amino resin formulations that cure at room temperature such as those found in the wood and plastics coatings industry, but the majority of commercially available formulations are typically cured at elevated temperatures and is described in this invention.

In a preferred embodiment of this invention a monomeric alkyloxymethylmelamine (Chemical Structure 1) with lower levels of dimeric and trimeric analogs (respectively Chemical Structures 2 and 3) which are linked either through methylene, —N—CH$_2$N— or methyleneoxy —NCH$_2$OCH$_2$N— bridges may be used.

Structure 1. Monomer of Alkylated Melamine Aminoplast where R is an alkyloxymethyl and preferably a methoxymethyl reactive group.

Structure 2. Dimer of Alkylated Melamine Aminoplast where R is an alkyloxymethyl and preferably a methoxymethyl reactive group.

Structure 3. Trimer of an Alkylated Melamine Aminoplast where R is an alkyloxymethyl and preferably a methoxymethyl reactive group.

Several catalysts may be optionally used to accelerate the cross-linking reaction of the composition, depending on the cure temperature and the particular amino resin used. Suitable catalysts include strong acids which are capable of catalysing the reaction between the aminoplast and the resin, including super-acids and blocked versions thereof. In a preferred embodiment a blocked acid can be used to achieve high reaction rates while providing improved formulation stability and maintaining the pH value unaltered. Blocked sulfonic acid catalysts, for example, amine-blocked sulfonic acid catalyst, are particularly suitable.

In a preferred embodiment, the liquid binder composition is an aqueous dispersion containing a polyhydroxyether-polyurethane copolymer; methoxyalkyl melamine (for example, tri- to hexa-methoxyalkyl melamine) as an aminoplast cross-linker; and a blocked acid catalyst (such as blocked sulfonic acid catalyst), wherein:

a. the copolymer may have a number molecular weight ($M_n$) in the 10000-100000 Da range and a polydispersity ($M_w/M_n$) in the range between 1.1 and 5, and b. the copolymer may have an average particle size (d50) in the range between 0.1 and 50 microns.

The amount of binder applied to the fibers may be less than about 15% by weight, and preferably less than 10%, and more preferably less than 5%, such as 4%, 3%, 2% or 1%.

In some embodiments, the polyhydroxether portion of the copolymer contains a Bisphenol-A, and the polyurethane portion of the copolymer is based on polyisocyanate and a polyol selected from a group consisting of aliphatic or aromatic polyether polyols, and polyester polyols.

The disclosed binder composition may be used for the impregnation, at room temperature, of self-supporting dry fibrous products suitable for automated lay down processes (e.g., ATL/AFP) with no limitation to the product width. The binder may be applied to the fibrous products by liquid dip-coating, roller coating or spraying on the fiber web. Furthermore, the binder composition may be applied to the totality or to specific areas of the fibrous product using standard manufacturing processes.

When the dry self-supporting unidirectional or textile material is used in a resin injecting process, it is useful if the binder does not form a continuous film at the surface of the unidirectional or textile material, which may prevent the resin from satisfactorily penetrating through the thickness of the preform comprising the unidirectional or textile material during the resin injection cycle.

Fibrous Materials

The initial fibrous materials to be treated with the liquid binder disclosed herein may be in the form of a self-supporting unidirectional tape, for example, having a width ranging from about several inches wide to narrow widths as low as ¼ inch, or a non-crimp fabric. The self-supporting unidirectional tape may be wound onto spools and can be used in the ATL/AFP process. The non-crimp fabric (NCF) containing unidirectional tows that are stitched together. The tows may or may not touch each other such that gaps are present between tows thus providing permeations in the material. In contrast, unidirectional tape does not contain stitching because it contains a type of binder chemical that keeps the fibers together. Unifiber is a trade name for a product that contains fine threads that bind the fibers together such that there are no gaps or permeations.

In certain embodiments, a nonwoven veil composed of randomly arranged fibers is laminated to a fiber web of structural fibers to form a dry tape, which is subsequently coated with the liquid binder composition disclosed herein. The veil may provide permeability to the binder-coated fibrous material. In some aspects, veils are made of structural material similar to that used as structural fibers such as carbon, glass, and aramid. Other purposes of veils include a means for holding fibers together; however, this is not the primary importance of veils in this application. The veil itself may contain additional binding or toughening agents/particles.

The term "fibrous material" as used herein may include structural fibers or fibrous materials adapted for the structural reinforcement of composites. The structural fibers may be made from high-strength materials such as carbon, glass, and aramid. The fibers may take the form of any one of short fibers, continuous fibers, sheets of fibers, fabrics, and combinations thereof. The fibers may further adopt any of unidirectional, multi-directional (e.g. two- or three-directional), nonwoven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, less than about 125000 filaments, and greater than about 125000 filaments. In further embodiments, the tows may be held in position by cross-tow stitches, weft-insertion knitting stitches, or a small amount of resin, such as a sizing agent.

The fibrous product that has been treated with the binder composition according to the present disclosure is a dry, self-supporting fibrous material. The term "dry" as used herein refers to a material that may be considered to have a dry feel, which is not tacky to the touch and substantially without any matrix resin. The term "self-supporting" refers to a cohesive form of fibers or filaments that do not separate from each other, for example, during the slitting process and other subsequent handlings such as when the fibrous product is processed through automated machines. For example, self-supporting refers the ability of the dry, self-supporting fibrous product to maintain the integrity of the fibrous material such as a favorable edge quality, that is, a clean edge, with no bridging fibers, fuzz, or other observed defects which otherwise could occur during the slitting process if binder treatment were not used. In some aspect, self-supporting fibrous product has edges after slitting that are substantially free of protruding dry filaments.

The binder-treated fibrous material can generally hold their position without the need for an additional carrier fabric or scrim to keep the fibers from separating. Furthermore, the dry, self-supporting fibrous material may be stored at room temperature, and does not need to be refrigerated due to the fact that it does not contain substantial amount of a matrix resin, in contrast to prepreg materials.

Veil

In some embodiments, a nonwoven veil may be used in addition to the binder composition to improve the in plane permeability of the material and favor the in plane resin flow. In some aspects, the veil may be a very light weight veil of about from 1 g to 8 g per square meter of the dry, self-supporting fibrous material, which is laminated thereto.

In addition, the veil may provide cross web direction stability to the unidirectional or textile material such as a unidirectional tape.

In a further beneficial aspect, the veil may be used as a carrier for composite toughening particles or fibers in the interlaminar region.

The veil may be of the same material nature than the fibers of the unidirectional or textile material or alternatively can be made of one or more organic material such as some toughening thermoplastic materials. In addition, the veil may comprise a hybrid mix of both the same type of fibers and at least one organic material.

The veil and the binder composition are used to aid the machine laydown of the fibrous material by application of heat (hot air, laser, or IR) and pressure via compaction roller. When polymer veils are used, the preferred softening point of the polymer veils and binders is 150° C. or less in order to allow material to bond and form a consolidated preform at acceptable machine speeds.

In some aspects, the in-plane resin injection cycle is 3 times faster than a similar composite without a light-weight veil, consequently the achievable ply flow length is significantly improved by a factor of 7.

Perforations

In some embodiments, the binder-treated fibrous material contains perforations therein. "Perforation" as used herein may include perforations through the entire thickness of the fibrous material. Perforated materials may provide air permeability above 50 cc/min, and allows infusion of preforms with thicknesses in excess of 30 mm in reasonable infusion times e.g.<4 hours.

Perforations may be performed either by needle punching, laser beaming or any other available methods to puncture the material through its thickness. Perforation hole dimensions, usually the diameter, is combined with the perforation density to achieve the expected air permeability. More air permeability is needed for forming thicker preforms i.e., with more plies, than with thinner preforms.

Usually a minimum of 20 cc/min is desirable for an effective flow of the resin. However, for preforms with thickness of more than 25 mm (1") a minimum of 50 cc/min is desirable. Of course the desired air permeability may be also a function of the resin viscosity and the processing conditions in particular temperature and part complexity.

For perforated materials, the fibers forming the unidirectional (UD) fiber web preferably do not move and cover the perforated holes, after the perforation step has been performed, otherwise the gain in air permeability would be reduced or nil. The binder composition disclosed herein previously keeps the fibers together and prevent them from covering the perforated holes.

Perforation of the fibrous material also includes creating some small slits or gaps between the fibers during the process of forming the UD fiber web.

Preform

The term "preform" or "fiber preform" as used herein include an assembly of fibers, layers of fibers, or fabric plies, such as unidirectional fibers and woven fabrics that are ready for receiving a liquid resin in a resin infusion process.

It has been found that using the self-supporting, binder-treated fibrous material, in some instances, results in high-performance composites made via a resin infusion process.

EXAMPLES

The following examples relate to dry unidirectional (UD) fiber materials for ATL/AFP application.

Example 1

The following fabrics were used in this Example.

Figure 1:
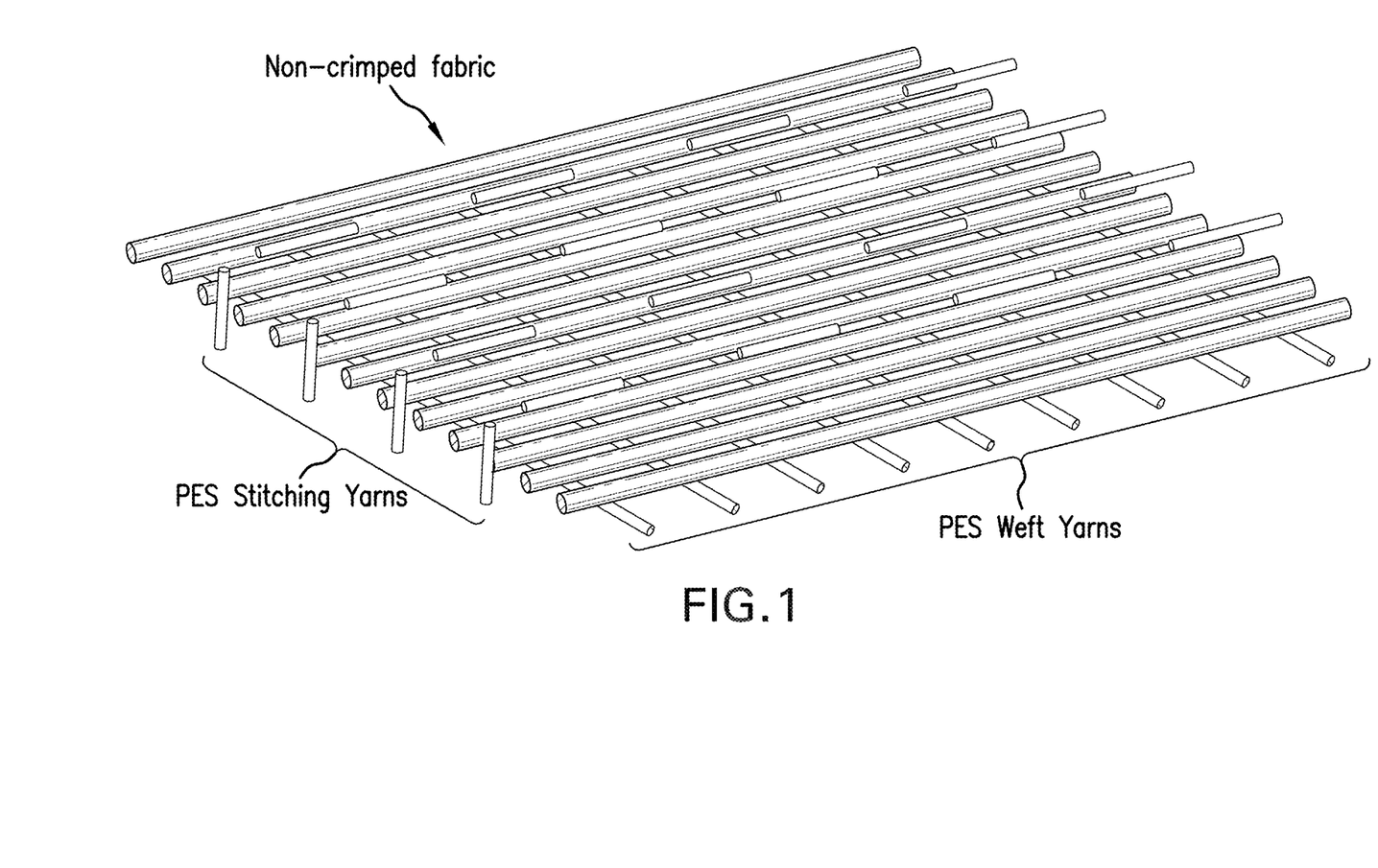
FIG. 1 illustrates a unidirectional non-crimp fabric (UD NCF).

(1) A unidirectional non-crimp fabric (UD NCF), supplied by Saertex, shown in FIG. 1. This fabric is produced at 50 inches wide. Carbon tow definition is very much present and intertow gaps are up to 2 mm wide. Polyester stitching thread keeps the carbon tows together. Fine polyester threads are laid down across the fabric to provide lateral integrity and stability to the fabric.

Figure 2:
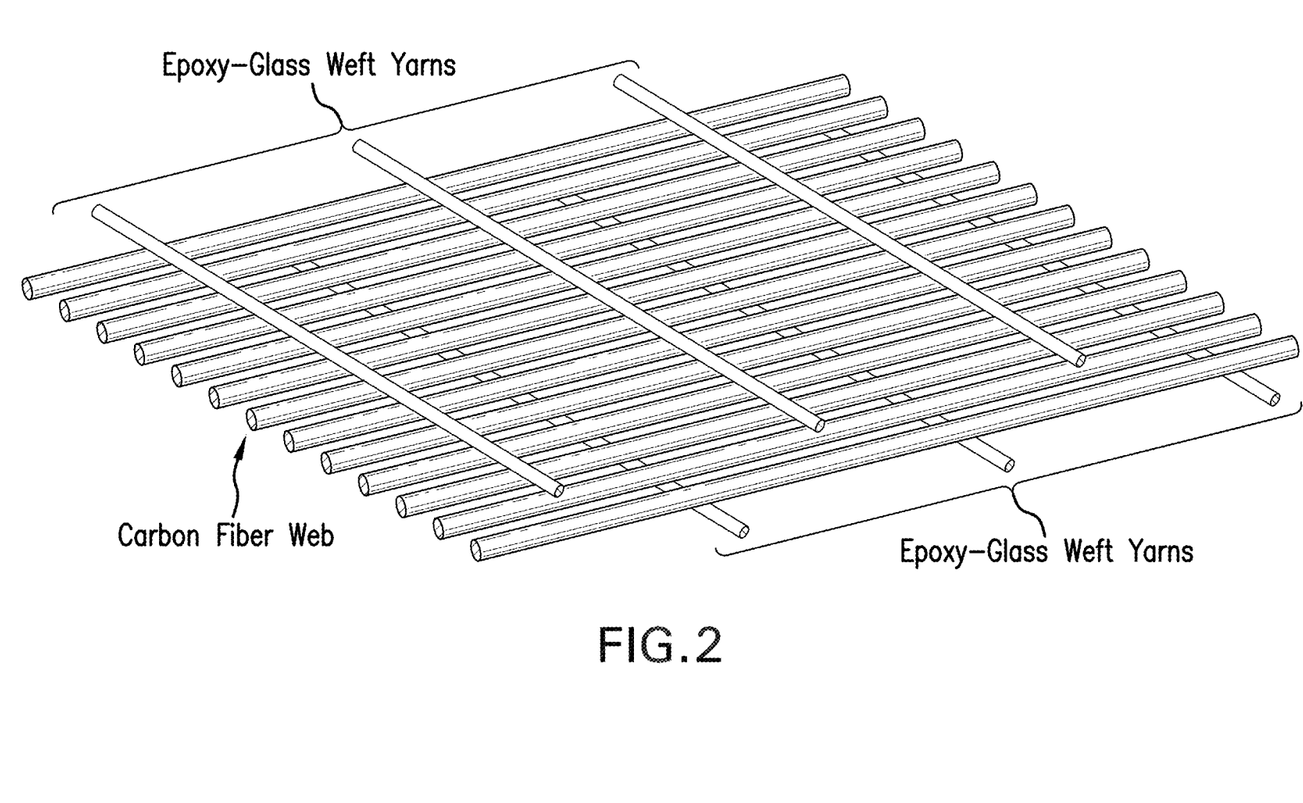
FIG. 2 illustrates a spread out carbon fiber web with binder yarns.

(2) A spread out web with binder yarns (Sigmatex Unifiber fabric) shown in FIG. 2. Carbon tows are spread out and held together by epoxy coated glass threads on both sides of the tapes. There are no intertow gaps or marginal gaps.

Both fabrics were binder coated with a thermoplastic-modified, epoxy-based binder (Cycom® 7720 from Cytec Engineered Materials). A powder scattering method was used to deposit about 5 gsm of the binder composition on both faces of each fabric. The fabrics with the scattered powder were run through a double belt press to further drive the binder through the fiber web and insure a good cohesion of the UD fiber web. This is called a stabilization step. In addition, a very light weight carbon veil with a fabric areal weight of 4 gsm was laminated onto one of the faces of each fabric at the same time the fabric was run through the double press to fix the binder. Double belt processing conditions were a speed of 2 m/min and a temperature of 210° C. The laminated, stabilized fabrics were very stable yet malleable, allowing manipulation to the desired shape without fibre loss or edge fraying.

Then the stabilized fabrics were slit to 50 mm wide tapes having a width variation of less than +/−1.0 mm. Edge quality of the slit tapes was sufficiently clean with limited bridging fibers, fuzz and or other observed defects. However, the product quality could be further improved for the manufacturing of large aircraft components using high speed automated production processes.

Example 2

A series of different catalyzed and uncatalyzed binding agents based on polyhydroxyether or polyurethane families, copolymers or combinations thereof were mixed according to the compositions disclosed in Table 1. EP1 is a 53% solid aliphatic epoxy novolac emulsion commercialized by COIM (Italy). PU1 is a 52% solid water dispersion of a 2,2-bis(4-hydroxyphenyl)propane modified polyurethane with an number average molecular mass of ~30000 Daltons. The polyurethane portion was obtained by reaction of isophorone diisocyanate and polypropylene glycol. PU2 is a 40% solid self-cross linkable thermoplastic polyurethane dispersion in water commercialized by BASF while PU3 and PU4 are respectively 43% and 34% solid self-crosslinkable polyester urethane dispersions in water commercialized by Bayer Material Science. PHE1 is 34% solid polyhydroxyether emulsion in water available from Inchem (US).

TABLE 1

Binder compositions

| Binder code | Resin water emulsion (g) | | | | | | Cross-linker (g) | | Catalyst (g) | DIW†† |
| --- | --- | --- | --- | --- | --- | --- | --- | --- | --- | --- |
| | EP1 | PU1 | PU2 | PU3 | PU4 | PHE1 | AMM* | MAPI† | b-p-TSA‡ | (g) |
| 1a | 100 | — | — | — | — | — | — | — | — | 100 |
| 1b | 100 | — | — | — | — | — | 5 | — | 3.5 | 100 |
| 1c | — | 100 | — | — | — | — | — | — | — | 100 |
| 1d | — | 100 | — | — | — | — | 5 | — | 3.5 | 100 |
| 1e | — | 50 | — | — | 50 | — | — | — | — | 100 |
| 1f | — | — | 100 | — | — | — | — | — | — | 100 |
| 1g | — | — | 100 | — | — | — | — | 10 | — | 100 |
| 1h | — | — | — | 100 | — | — | — | — | — | 100 |
| 1i | — | — | — | 100 | — | — | — | 10 | — | 100 |
| 1l | — | — | — | — | 100 | — | — | — | — | 100 |

*AlkylatedMethylMelamine (AMM)
†Modified Aliphatic PolyIsocyanate (MAPI)
‡Blocked p-ToluenSulfonic Acid (b-p-TSA)
††Deionized water The binding agents were used to dip-coat the same unidirectional non-crimp fabric (Saertex, Germany) described in Example 1.

The binder-coated fabrics were evaluated for drape-ability, anti-fraying behavior, shrinkage, and self-bond ability. Drape was determined by hot-draping at 145° C. (3° C./min temperature ramp rate from room temperature) for 1 minute a 350×350 mm coated fabric onto a conic tool (height=86 mm, internal diameter=120 mm, external diameter=310 mm) under vacuum (60 mmHg vacuum throughout the test) and determining the number of creases. Materials giving less than 6 creases were considered excellent (A), materials resulting in 6-12 creases were considered acceptable (B) while materials producing more than 12 creases were considered unacceptable (C).

Anti-fraying behavior was determined in a developmental controlled tension fuzz tester having four sections (let-off, friction rollers, catch plate and winder) running at a speed of 20 m/min. The amount of fuzz accumulated on the catch plate over a period of 5 minutes was weighted and materials ranked accordingly. Fuzz is the debris given off by tows rubbing against the friction rollers and collected by the catch plate. Materials resulting in more than 500 mg of fuzz were considered unacceptable (C), materials giving off between 200 mg and 500 mg where considered acceptable (B) whereas materials creating less than 200 mg of fuzz were considered excellent (A). Shrinkage was determined by measuring the width of the pristine and binder coated fabric after the heat treatment (3 minutes at 100° C.+4 minutes at 130° C.). Materials resulting in less than 1% shrinkage were considered excellent (A), materials giving 1-2% were considered acceptable (B) while materials giving more than 2% were considered unacceptable (C). Self-bond ability was determined by applying a 10N pressure using a compaction roller at a temperature of 100° C. for 5 seconds. The results are shown in Table 2.

TABLE 2

Physical properties of binder coated fabrics

| Fabric code | Binder | Binder content (w/w %) | Drape | Anti-fraying behavior | Shrinkage | Self-bond ability |
| --- | --- | --- | --- | --- | --- | --- |
| 2a | 1a | 3 | A | B | A | B |
| 2b | 1b | 3 | A | B | A | C |
| 2c | 1c | 1 | A | B | A | B |
| 2d | 1d | 1 | A | A | A | A |
| 2e | 1d | 2 | A | A | A | A |
| 2f | 1e | 4 | C | A | B | B |
| 2g | 1f | 2 | B | B | B | B |
| 2h | 1f | 3 | A | B | A | B |
| 2i | 1g | 1.5 | A | B | A | A/B |
| 2l | 1g | 3 | A | A | A | A/B |
| 2m | 1h | 5 | A | A | A | A |
| 2n | 1h | 2.5 | A | A | A | A |
| 2o | 1i | 5.0% | A | B | B | B/C |
| 2p | 1i | 2.5% | A | B | B | B/C |
| 2q | 1i | 1% | A | B | A | C |
| 2r | 1l | 3.0% | B | B | B | C |

A = excellent
B = acceptable
C = unacceptable

Depending on the binder composition and content on the fibrous product, a specific pattern of physical properties can be achieved using the binder compositions described in Table 1.

Example 3

Some of the binder compositions disclosed in Table 1 were used to dip coat at room temperature the same unidirectional non-crimp fabric (Saertex-Germany) described in Example 1. All the coated fabrics were then dried for 3 minutes at 100° C. and then for 4 minutes at 130° C. in an oven.

The binder-coated non-crimp fabrics were then cut into smaller plies and the plies were laid-down in a stacking sequence. The layup was then pre-formed in an oven at 130° C. for 30 minutes and infused with Prism® EP2400 (toughened epoxy system available from Cytec Engineered Materials). Panels having a $V_f$ (fiber volume fraction) in the 55%-57% range were produced after curing the infused preforms at 180° C. for 2 h.

For comparison purposes, the same pristine (uncoated) unidirectional non-crimp fabric was used to prepare otherwise identical test panels (Control 1). A variety of mechanical tests were carried out on the panels and the results are shown below in Table 3.

TABLE 3

Thermo-mechanical performance of Prism ® EP2400 infused panels

| Panel | Binder | 0 CM (GPa) EN2850 | 0 CS (MPa) EN2850 | 0 TM (GPa) EN6035 | TS (MPa) EN6035 | ILSS (MPa) EN60 | Tg (° C.) EN6032 |
|---|---|---|---|---|---|---|---|
| Control 1 | — | 134.1 | 1226.2 | 147.1 | 2310.4 | 80.6 | 173.2 |
| 3a | Ex. 2d | 131.5 | 1143.2 | 136.3 | 2266.8 | 93.2 | 163.8 |
| 3b | Ex 2i | 137.3 | 833.0 | 134.8 | 2245.5 | 77.6 | 161.4 |
| 3c | Ex. 2q | 133.5 | 1054.8 | 125.4 | 2176.2 | 41.6 | 172.3 |

Example 4

Figure 3:
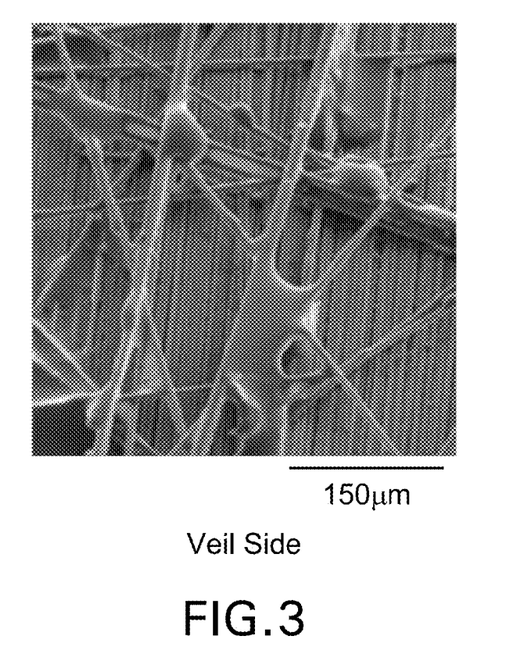
FIG. 3 is an SEM image showing veil side of a binder-treated, fibrous material according to one example.
Figure 4:
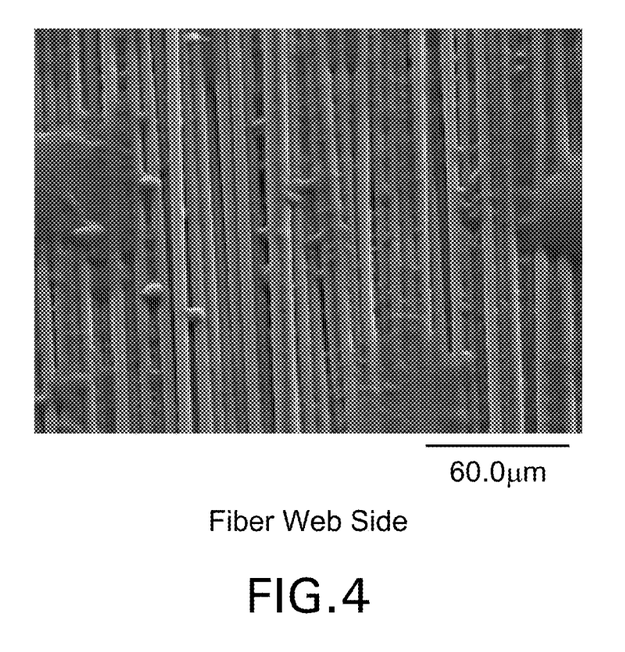
FIG. 4 is an SEM image showing fiber web side the fibrous material shown in FIG. 3.

Intermediate modulus carbon fibers (Tenax IMS 65) were formed into a 12" wide unidirectional web of 196 gsm using a prepreg tape machine while a 4 gsm carbon veil and 5 gsm of thermoplastic-modified epoxy-based binder were laminated to the unidirectional web on the same prepreg tape machine. The resulting unidirectional tape was subsequently liquid coated with the binder described in Example 2d to achieve a 3 gsm binder coating. SEM pictures, FIGS. 3 and 4, show on both the veil side and fiber web side the presence of the binders which do not form a film, each having distinctive morphology with binder described in Example 2d forming droplets smaller than the carbon fiber diameter while the other binder forms much larger binder particle sizes that overlap several fibers but do not form a film.

This unidirectional tape was then slit into multiple tows of different widths. Each tow width was measured using an electronic automated measurement device equipped with a very fine resolution digital camera. About 2900 measurements were collected for each tow width. Table 4 below summarizes the measurement analysis.

TABLE 4

Target and experimental slit tape widths

| | Target width | | | | | |
|---|---|---|---|---|---|---|
| Measured data | 4.300 | 5.400 | 5.800 mm | 6.000 | 6.100 | 6.350 |
| Avg | 4.295262 | 5.408842 | 5.814885 | 6.050919 | 6.12134 | 6.34403 |
| Max | 4.471 | 5.638 | 6.147 | 6.174 | 6.36 | 6.44 |
| Min | 4.151 | 5.23 | 5.695 | 5.919 | 6.041 | 6.28 |
| Std dev | 0.031464 | 0.047753 | 0.030349 | 0.040826 | 0.026212 | 0.024468 |
| COV | 0.007325 | 0.008829 | 0.005219 | 0.006747 | 0.004282 | 0.003857 |

In Table 4, COV is the coefficient of variation and it is calculated by dividing the standard deviation (Std dev) by the average (Avg).

Example 5

Comparative Example

Z Direction Permeability Evaluation

The z direction resin permeability of the material described in Example 4 (6.35 mm-¼" wide) was compared to the one of a commercial binder coated/formed carbon tow (IMS60 24K) of equal width and similar areal weight.

Preforms were manufactured using an AFP machine with a laser head to compact dry fabrics by applying approximately 100N pressure and a local surface temperature in the 120° C.-180° C. range. 150×150 mm quasi-isotropic preforms of approximately 10 mm were laid-down with a target gap setting of 0 mm between adjacent tows.

Preforms were then infused with Prism® EP2400 (toughened epoxy system available from Cytec Engineered Materials) at 100° C. using a bagging arrangement to promote through thickness resin flow and a vacuum of <5 mbar. The volume of infused resin was monitored over time.

Figure 5:
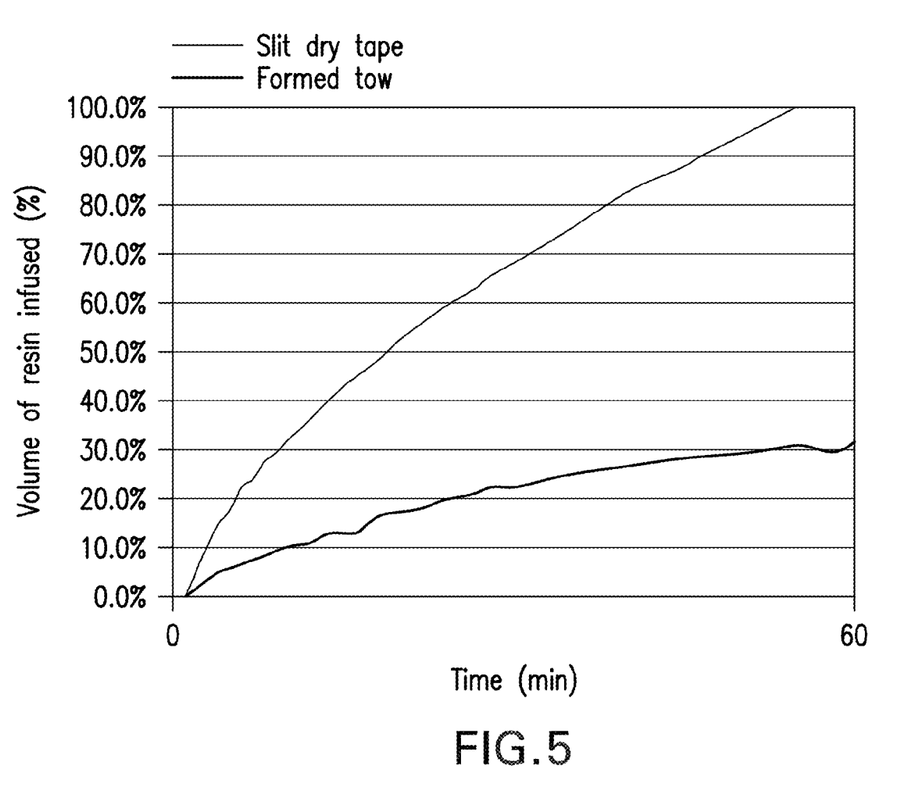
FIG. 5 is a graph showing the relative volume of resin infused through a preform thickness as a function of time, according to an example.

FIG. 5 shows the relative volume of resin infused through the preform thickness as a function of time.

The preform manufactured using the material described in Example 4 resulted in the best permeability values allowing the entirety of the resin to flow through the preform thickness in less than 1 hour while only the 20% of the resin volume penetrated the formed tow preform in over 1 hour due to the inferior width tolerance of the product, its propensity to nest during the lay-down process and the resulting high variation in local CPT.

What is claimed is:

1. A slit tape formed from slitting a dry, self-supporting fibrous material, the fibrous material comprising:
   a ply of dry structural fibers laminated to a nonwoven veil of randomly-arranged fibers; and
   a binder composition distributed to the structural fibers and the nonwoven veil, said binder composition comprising (i) a copolymer or a reaction product of polyhydroxyether and polyurethane and (ii) an aminoplast crosslinker,
   wherein
   the ply of structural fibers is in the form of unidirectional fibers or a woven fabric,
   the binder composition is present in an amount of 15% or less by weight based on the total weight of the fibrous material and does not form a continuous film at the surface of the fibrous material, and
   the fibrous material is permeable to liquid resin.

2. The slit tape of claim 1,
   wherein the ply of structural fibers is not bonded to another layer other than the nonwoven veil.

3. The slit tape of claim 1, wherein the binder composition further comprises a catalyst of sufficient acid strength to catalyze the crosslinking reaction.

4. The slit tape of claim 1, wherein the fibrous material further comprises particles of an epoxy-based binder.

5. The slit tape of claim 1, wherein the nonwoven veil has an areal weight of about 1 to 8 grams per square meter of the dry self-supporting fibrous material.

6. The slit tape of claim 1, wherein the nonwoven veil comprises thermoplastic fibers that are soluble in epoxy resins.

7. The slit tape of claim 1, wherein the veil comprises fibers made of carbon or polymeric material.

8. The slit tape of claim 1, wherein the veil comprises glass or aramid fibers.

9. The slit tape of claim 4, wherein the ply of structural fibers are in the form of unidirectional fibers and the nonwoven veil is comprised of carbon fibers.

10. The slit tape of claim 1, wherein the nonwoven veil comprises carbon fibers.

11. The slit tape of claim 1, wherein the slit tape has a width of 24 inches or less.

12. The slit tape of claim 1, wherein the slit tape has a width of 1.5 inches or less.

13. A method of making the slit tape of claim 1, comprising:
    laminating the ply of structural fibers to the nonwoven veil of randomly arranged fibers to form a laminated structure;
    coating the laminated structure with a water-borne binder composition comprising the copolymer or reaction product of polyhydroxyether and polyurethane, the aminoplast cross-linker, and optionally a catalyst;
    drying the coated, laminated structure; and
    slitting the coated structure into tapes.

14. The method of claim 13, further comprising depositing particles of an epoxy-based binder onto the ply of structural fibers or to the veil prior to laminating.

15. A method comprising laying up a plurality of the slit tapes of claim 1 in an automated process to form a preform that can be infused with a liquid matrix resin.

* * * * *